Patented Jan. 15, 1924.

1,480,607

UNITED STATES PATENT OFFICE.

JOSEPH A. FORD, OF BROOKLYN, NEW YORK.

PROCESS OF TREATING AND PRESERVING CHERRIES.

No Drawing.   Application filed October 18, 1922.   Serial No. 595,424.

*To all whom it may concern:*

Be it known that I, JOSEPH A. FORD, a citizen of the United States, and resident of Brooklyn, in the county of Kings and State of New York, have invented certain new and useful Improvements in Processes of Treating and Preserving Cherries, of which the following is a specification.

This invention relates to a process of treating and preserving cherries, and more particularly to the preliminary treatment of the cherries before pitting and the refrigeration of the pitted cherries.

The object of the invention is to prevent the escape of juice from the pitted cherries, and to maintain them plump and firm and in a fresh condition.

In preparing cherries for shipment for use by the baking trade and manufacturers of preserves, it had prior to my invention been the custom to remove the pits from the cherries without any preliminary treatment except washing to remove dust and dirt, and to pack the pitted cherries in hermetically sealed tins in the usual manner of canning fruit.

When treated in this way a large quantity of the juice escapes from the cherries both during the pitting process and in the containers, and the cherries are left in a more or less mushy condition. Furthermore owing to the necessary use of heat in canning the cherries they are not left in the most desirable condition.

I have found that if the cherries are thoroughly chilled before pitting there is substantially no loss of juice either during the pitting process or in the containers, the juice being retained in the pulp of the fruit, and the cherries being plump and firm. I have also found that the pitted cherries can be maintained in a fresh condition by freezing them in large containers if proper steps are taken to insure thorough freezing and to allow the escape of any gas that may form during the freezing period.

In carrying out my process the cherries are chilled, preferably as soon as picked, by subjecting them to a temperature slightly above the freezing point of water, that is, a temperature of water containing a relatively large amount of ice, and pitting the cherries while in this chilled condition. The chilling can be expeditiously accomplished by placing the cherries in tanks of water of the desired temperature, a period of 20 to 30 minutes being sufficient to insure thorough chilling. If water of a sufficiently low temperature is not available from natural sources, the proper temperature can be maintained by the use of refrigerating coils, or by placing a relatively large amount of ice in the tanks.

The pitting can be done on the usual pitting machines, which are preferably so arranged in relation to the chilling tanks that the cherries can be conveyed therefrom to the machines on endless conveyors, any defective fruit being removed from the conveyors so that only sound cherries reach the machines.

After the pits are removed the cherries are packed in large containers provided with vents and thoroughly frozen. I have found that hard wood kegs or barrels, such as wine barrels, are best adapted for this purpose. The filled containers are subjected to a freezing temperature until the cherries are frozen throughout. I have found that the best results are obtained by freezing at a temperature of from 8° to 15° F. and that a period of from 3 to 5 days is sufficient to insure thorough freezing.

During the first forty-eight hours of the freezing period the containers should be agitated to break up the outer layers of frozen fruit, and insure thorough freezing throughout, and from time to time during this period the vents of the containers should be opened to permit the escape of any gas that may form.

At the end of the freezing period the containers can be shipped in refrigerator cars and placed in cold storage at a temperature sufficiently low to maintain the fruit in frozen condition until desired for use.

Cherries treated in this manner will be found to be in a most desirable condition for use, being plump and firm, and substantially as fresh as when first picked.

What I claim is:

1. The process of treating and preserving cherries, which consists in chilling them before pitting, removing the pits, packing the pitted cherries in containers, and freezing them.

2. The process of treating and preserving cherries which consists in thoroughly chilling them before pitting, removing the pits, packing the pitted cherries in air-tight containers and freezing them.

3. The process of treating and preserving cherries which consists in chilling the whole fruit in ice water for a period of from 20 to 30 minutes, removing the pits, packing the pitted cherries in air-tight containers and freezing them.

4. The process of treating and preserving cherries which consists in thoroughly chilling the whole fruit, removing the pits, packing the pitted fruit in air-tight containers and subjecting it to a temperature of from 8° to 15° F. until thoroughly frozen.

5. The process of treating and preserving cherries which consists in thoroughly chilling the whole fruit, removing the pits, packing the pitted fruit in air-tight containers and subjecting it to a temperature of from 8° to 15° F. for a period of 3 to 5 days.

6. The process of treating and preserving cherries which consists in chilling the whole fruit, removing the pits, packing the fruit in air-tight containers, and subjecting it to a temperature of from 8° to 15° for a period of 3 to 5 days and agitating the containers during this period.

Signed at Brooklyn in the county of Kings and State of New York this 11th day of October A. D. 1922.

JOSEPH A. FORD.